US011143666B2

United States Patent
Curcie et al.

(10) Patent No.: US 11,143,666 B2
(45) Date of Patent: Oct. 12, 2021

(54) MANAGING SAMPLE EXPOSURE TO AIR ON AN AUTOMATION SYSTEM FOR PERFORMING CLINICAL LABORATORY IN-VITRO DIAGNOSTICS

(71) Applicant: Siemens Healthcare Diagnostics Inc., Tarrytown, NY (US)

(72) Inventors: David Curcie, Flanders, NJ (US); Jack Zheng, Basking Ridge, NJ (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 285 days.

(21) Appl. No.: 16/319,234

(22) PCT Filed: Jul. 19, 2017

(86) PCT No.: PCT/US2017/042908
§ 371 (c)(1),
(2) Date: Jan. 18, 2019

(87) PCT Pub. No.: WO2018/017745
PCT Pub. Date: Jan. 25, 2018

(65) Prior Publication Data
US 2019/0265260 A1    Aug. 29, 2019

Related U.S. Application Data

(60) Provisional application No. 62/365,206, filed on Jul. 21, 2016.

(51) Int. Cl.
*G01N 35/04* (2006.01)
*G01N 35/00* (2006.01)

(52) U.S. Cl.
CPC .......... *G01N 35/04* (2013.01); *G01N 35/0095* (2013.01); *G01N 35/00732* (2013.01);
(Continued)

(58) Field of Classification Search
CPC ............. G01N 35/04; G01N 35/00732; G01N 35/0095; G01N 2035/00287;
(Continued)

(56) References Cited

U.S. PATENT DOCUMENTS

| 5,554,127 A | 9/1996 | Crouther et al. |
| 5,651,941 A | 7/1997 | Stark et al. |

(Continued)

FOREIGN PATENT DOCUMENTS

| CN | 102759630 A | 10/2012 |
| CN | 104053997 A | 9/2014 |

(Continued)

OTHER PUBLICATIONS

PCT International Search Report and Written Opinion dated Oct. 18, 2017 (9 Pages).

(Continued)

*Primary Examiner* — Jill A Warden
*Assistant Examiner* — John McGuirk

(57) ABSTRACT

A method for managing sample exposure to air on an automation system for performing clinical laboratory in-vitro diagnostics (IVD) includes receiving a sample in a capped container and loading the capped container onto a sample carrier. A plurality of test requests corresponding to the sample is received. Optionally, the capped container may be parked on a sample handler pending readiness of the system to process the test requests. Each test request is associated with one or more analytical modules included in an automated IVD system. In response to determining that the first analytical module is available to perform the first test request, the capped container is reloaded from the sample handler, if necessary, and decapped. Next the system performs prioritized delivery of the decapped container to the analytical modules in order to optimize performance of (Continued)

the assays with respect to the stability of the sample's analytes.

18 Claims, 3 Drawing Sheets

(52) U.S. Cl.
CPC .............. *G01N 2035/00287* (2013.01); *G01N 2035/0405* (2013.01)

(58) Field of Classification Search
CPC .. G01N 2035/0405; G01N 2035/00277; B01L 2200/141
See application file for complete search history.

(56) References Cited

U.S. PATENT DOCUMENTS

| | | | |
|---|---|---|---|
| 5,679,309 | A | 10/1997 | Bell |
| 5,885,530 | A | 3/1999 | Babson et al. |
| 9,182,751 | B1 | 11/2015 | Reeder |
| 2001/0019826 | A1* | 9/2001 | Ammann ................ B03C 1/282 435/6.11 |
| 2007/0060841 | A1 | 3/2007 | Henshaw |
| 2009/0318276 | A1* | 12/2009 | Miller ................ G01N 35/0092 494/20 |
| 2012/0275885 | A1* | 11/2012 | Furrer .............. G01N 35/00732 414/222.02 |
| 2014/0370608 | A1 | 12/2014 | Gelbman et al. |

FOREIGN PATENT DOCUMENTS

| | | |
|---|---|---|
| CN | 105579854 A | 5/2016 |
| EP | 2 225 567 A1 | 9/2010 |
| EP | 2 518 514 A1 | 10/2012 |
| JP | H11-500224 A | 1/1999 |
| JP | 2013-541718 A | 11/2013 |
| JP | 2015-509581 A | 3/2015 |
| WO | 2013/035418 A1 | 3/2013 |

OTHER PUBLICATIONS

Extended EP Search Report dated Jul. 11, 2019 of corresponding European Application No. 17831811.9, 4 Pages.

\* cited by examiner

MANAGING SAMPLE EXPOSURE TO AIR ON AN AUTOMATION SYSTEM FOR PERFORMING CLINICAL LABORATORY IN-VITRO DIAGNOSTICS

This application claims the benefit of U.S. Provisional Application Ser. No. 62/365,206 filed Jul. 21, 2016, which is incorporated herein by reference in its entirety.

TECHNICAL FIELD

The present invention relates generally to methods, systems, and apparatuses for managing a sample's exposure to air in an automated testing system. The technology described herein may be applied to, for example, performing clinical laboratory in-vitro diagnostics in an automated testing environment.

BACKGROUND

In-vitro diagnostics (IVD) allows labs to assist in the diagnosis of disease based on assays performed on patient fluid samples. IVD includes various types of analytical tests and assays related to patient diagnosis and therapy that can be performed by analysis of a liquid sample taken from a patient's bodily fluids, or abscesses. These assays are typically conducted with automated clinical chemistry analyzers ("analyzers") onto which fluid containers, such as tubes or vials containing patient samples, have been loaded. The analyzer extracts a liquid sample from the vial and combines the sample with various reagents in special reaction cuvettes or tubes (referred to generally as reaction containers). In some IVD systems, a modular approach is used for analyzers. A lab automation system can shuttle samples between one sample processing module (module) and another module. Modules may include one or more stations, including sample handling stations and testing stations (e.g., a unit that can specialize in certain types of assays or can otherwise provide testing services to the larger analyzer), which may include immunoassay (IA) and clinical chemistry (CC) stations. Some IVD automation track systems comprise systems that are designed to transport samples from one fully independent module to another standalone module. This allows different types of tests to be specialized in two different stations or allows two redundant stations to be linked to increase the volume of sample throughput available.

Sample degradation occurs when samples are exposed to air while awaiting processing at individual modules or while being transported between modules. This degradation could compromise the quality of the analytical results for assays performed on the sample. Conventional systems simply decap the sample and process it. Sample custody on the system may be tracked for the purposes of tracking centrifuged samples or whole blood samples against a predetermined time limit. However, that time limit is often just a configurable value based on the specimen type, and not directly based on the specific analysis being performed on the sample.

SUMMARY

Embodiments of the present invention address and overcome one or more of the above shortcomings and drawbacks by providing methods, systems, and apparatuses related to managing sample exposure to air on an automation system for performing clinical laboratory IVD. The techniques described herein provide, among other things, the ability to measure and control the time during which a decapped sample is exposed to air.

According to some embodiments, sample exposure to air is managed according to a method which begins by receiving a sample in a capped container and loading the capped container onto a sample handler. After the samples are identified and the test requests are received, the first analytical module associated with the first test request is identified. If the first analytical module is available for testing, the capped container is transported to the decapper and the container is decapped. Then, a prioritized delivery of the decapped container to the first analytical module is performed. If no analytical module is available to immediately process the test orders, the capped sample container may remain parked on the sample handler until an analytical module becomes available, after which the sample is transported to be decapped and subsequently aspirated. Following sample aspiration at the first analytical module, the decapped container may be transported to one or more additional analytical modules or the test requests may be designated as being complete. In some embodiments, transportation of the decapped container to the first analytical module and the one or more additional analytical modules is performed using a linear motor system which applies motive force to a carrier holding the decapped container.

In some embodiments of the aforementioned method, if the decapped container is time-critical for exposure to air, the decapped container is prioritized for delivery to the processing queue of the first analytical module ahead of one or more other samples awaiting testing. Conversely, if the decapped container is not time-critical for exposure to air, the decapped container may be entered at the end of the processing queue of the first analytical module.

In other embodiments, of the aforementioned method, a timer is initialized upon decapping the capped container. A minimum time threshold associated with the first test request may be used in conjunction with this time to prioritize delivery of the decapped container for aspiration in the first analytical module's processing queue. Additionally, prioritization of the decapped container in the first analytical module's processing queue may be further based on a relative stability value associated with the sample (e.g., as determined using a table of reference data). During the method, if it is determined that the relative stability value of the sample exceeds a predetermined stability threshold, further testing of the sample may be prevented or a stability flag may be associated with the sample that persists throughout all further testing of the sample. If the timer reaches a predetermined limit, the sample may be automatically sealed by the system if sealing capability exists, or an alert may be sent to an operator instructing the operator to manually seal the decapped container as soon as possible.

According to another aspect of the present invention, a system for managing sample exposure to air on an automation system for performing clinical laboratory in-vitro diagnostics includes a track and one or more analyzer modules. The track comprises a linear motor system which applies motive force to carriers containing sample containers. Each analyzer module uses a section of the track comprising its queue to prioritize processing of the sample containers after decapping based on each sample container's sensitivity to air exposure. The track has the capability to move sample carriers bidirectionally as required to deliver samples requested by the analyzer in a random access manner.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawing. For the purpose of illustrating the invention, there is shown in the drawing embodiments that are presently preferred, it being understood, however, that the invention is not limited to the specific instrumentalities disclosed. Included in the drawing is the following Figure.

DETAILED DESCRIPTION

The following disclosure describes the present invention according to several embodiments directed at methods, systems, and apparatuses related to managing sample exposure to air on an automation system for performing clinical laboratory IVD. Briefly techniques described herein provide the ability to measure and control the exposure time of the decapped sample individually. Thus, for example, the exposure time of each sample to air may be minimized on an individual level based on the availability of test orders. This allows decapping of samples to be delayed until there are test requests that can be processed by the system. The techniques described herein also provide the ability to schedule test request processing at an analytical module using a prioritization scheme based on stability of the sample analyte corresponding to each assay type. Additionally, in some embodiments, a decapped sample may be released from the analyzer's in-process queue (IPQ) for further processing, even if it is physically blocked by other samples (further optimizing sample processing workflow and minimizing exposure to air for test processing).

Figure 1:
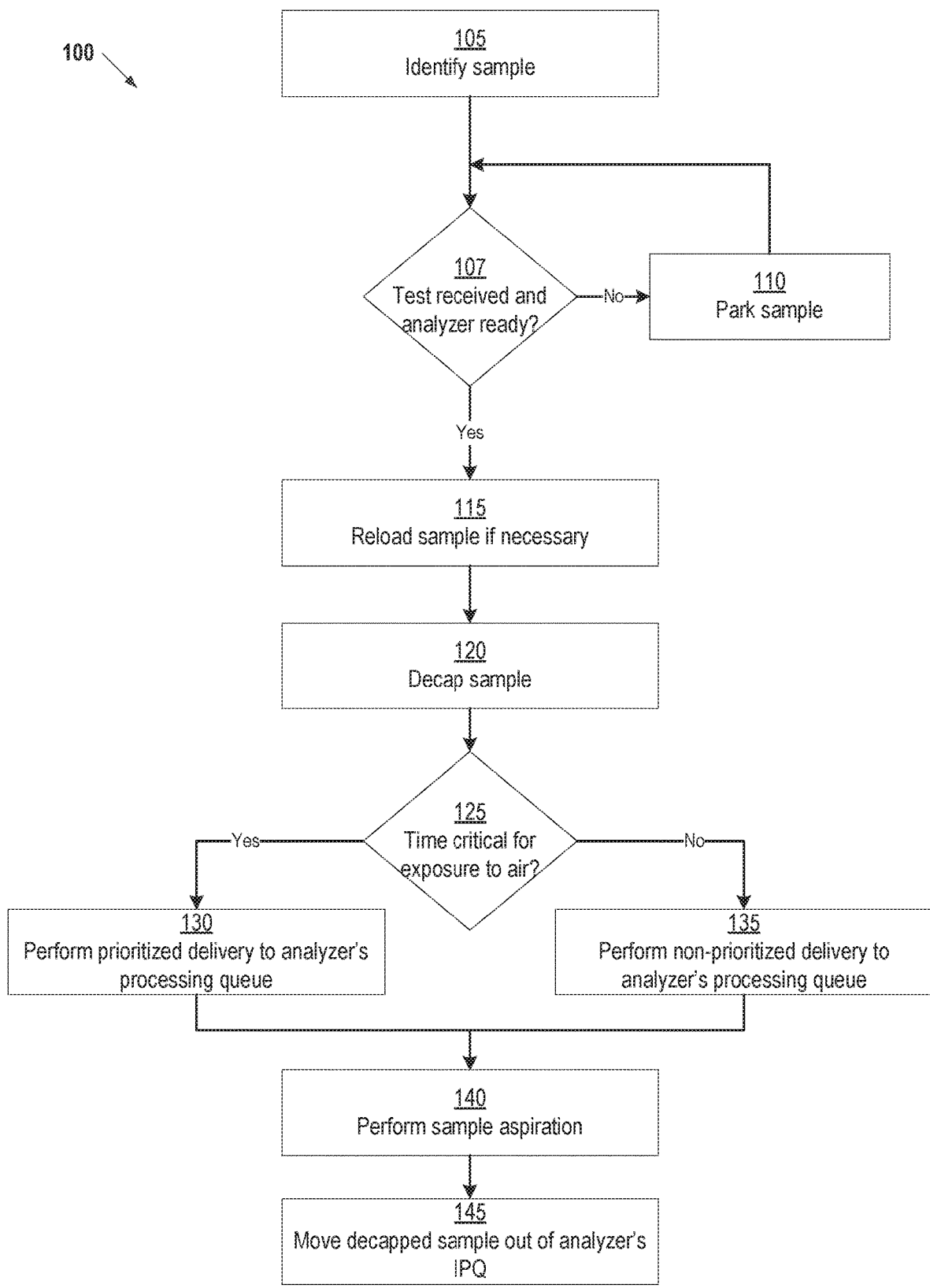
FIG. 1 illustrates an example method for managing sample exposure to air on an automation system for performing clinical laboratory IVD, according to some embodiments.

FIG. 1 provides an example method 100 for managing sample exposure to air on an automation system for performing clinical laboratory IVD, according to some embodiments. This method may be performed using one or more computers included in the automation system in conjunction with other system components such as an automated clinical chemistry analyzer, a transportation system for moving samples to different analytical modules associated with the system, and apparatuses that control and manage the sample during testing. Additional details on these system components are provided below in the discussion of the method 100.

Starting at step 105, the sample is identified using one or more techniques generally known in the art. For example, in some embodiments, sample identification may be performed by scanning a linear or matrix barcode placed on the container containing the sample. In other embodiments, radio-frequency identification (RFID) or similar technologies may be employed. After sample identification, at step 107, the system determines whether the sample is ready to be processed according to two conditions. First, the system determines whether the test requests have been received corresponding to the sample. Second, the system determines whether an analyzer module is ready to process the sample. If one or both of these conditions fails, at step 110, the system parks the still-capped sample temporarily on a sample handler temporarily to delay delivery of the samples into the analyzer's processing queue until the system receives indication that the test requests were received and an analyzer is available. It should be noted that, in other embodiments of the present invention, additional conditions may be added to step 107 to further the test preparation process.

While at step 110, the system may periodically repeat step 107, checking whether the two conditions are met. Alternatively, logic may be available in the system that allows the automatically detect when the conditions are met. For example, the system may check all incoming test requests against a list of requests corresponding to parked samples that are waiting for test requests.

Once the system determines that an analyzer module is available, and containing appropriate inventory to perform the test requests, at step 115, the system reloads the sample from the sample handler (in the event that it is parked) and then proceeds to step 120 and decaps the sample (see decapper 40 in FIG. 2A), thereby minimizing sample exposure to air. Step 115 may be skipped in instances where the two conditions set forth in step 107 are met upon initial receipt of the sample for processing. Thus, the sample can proceed immediately to step 120 for processing.

At step 125, the system determines whether the sample is time critical due to its exposure to air. The time criticality may be based, for example, on the analytes present in the sample. As a chemistry methods study, the analytes would have been profiled for stability when exposed to air. To support this feature, a table of reference data may be provided to the system for lookup. The known relative stability of the sample for each test request can also be used to determine relative priority of scheduling and processing for each test request. This can help to maximize the overall quality of the results produced by the system.

If the decapped sample is time-critical for exposure to air, at step 130 the system prioritizes delivery of the sample ahead of other samples for delivery to the appropriate analyzer module's processing queue. This may include, for example, dynamically bumping out one or more other lower priority samples in the queue in order to free up a position. If the decapped sample is not time-critical for exposure to air, at step 135 the system performs non-prioritized delivery of the sample to the analyzer's processing queue, for example, by entering the sample at the end of the queue.

Aside from the use of prioritization, as described above with reference to steps 125-135, one or more additional features of the system may be utilized to minimize the transport time of the decapped sample from the decapper to the analyzer. For example, in some embodiments, the system includes a sample transport track that has the ability to rapidly transport the sample directly to the appropriate analyzer module for aspiration. This sample transport track may be, for example, an enhanced friction-based track or a track which utilizes linear motors to provide motive force to the samples as they are transported to the analyzer.

Continuing with reference to FIG. 1, at step 140 sample aspiration is performed at one or more analytical modules. After sample aspiration at each analytical module is finished, the decapped sample is moved out of the analyzers's IPQ. In some embodiments, the system allows random access to samples in the IPQ. This provides the system with the ability to provide access to any sample in the queue for aspiration, and to move the sample out of the analyzer's IPQ rapidly, even if it is physically blocked by other samples in the IPQ. In turn, this also expedites further processing at other analytical modules.

In some embodiments, the system tracks the amount of time accumulated after each sample has been decapped, and compares that to a minimum time threshold that is determined based on properties of the test requests that are ordered. The measured time can be captured and associated with each individual test request aspiration for later data analysis purposes.

Sample stability thresholds could be represented by, for example, a plurality of levels (e.g., "Good," "Warning," "Exceeded"). If the exposure time of the decapped sample reaches a predetermined time limit, the system may send an alert event to the operator to take an action, such as seal the sample and archive it as soon as possible. If the sample exceeds the stability threshold, the sample could either be marked with an error status, preventing further processing or the sample could be flagged so that all further test requests processed to result could carry the sample stability warning flag. Additionally, after testing is complete, the sample stability flag associated with each result is used for forensic purposes for evaluating the accuracy or reliability of the reported test result.

Figure 2A:
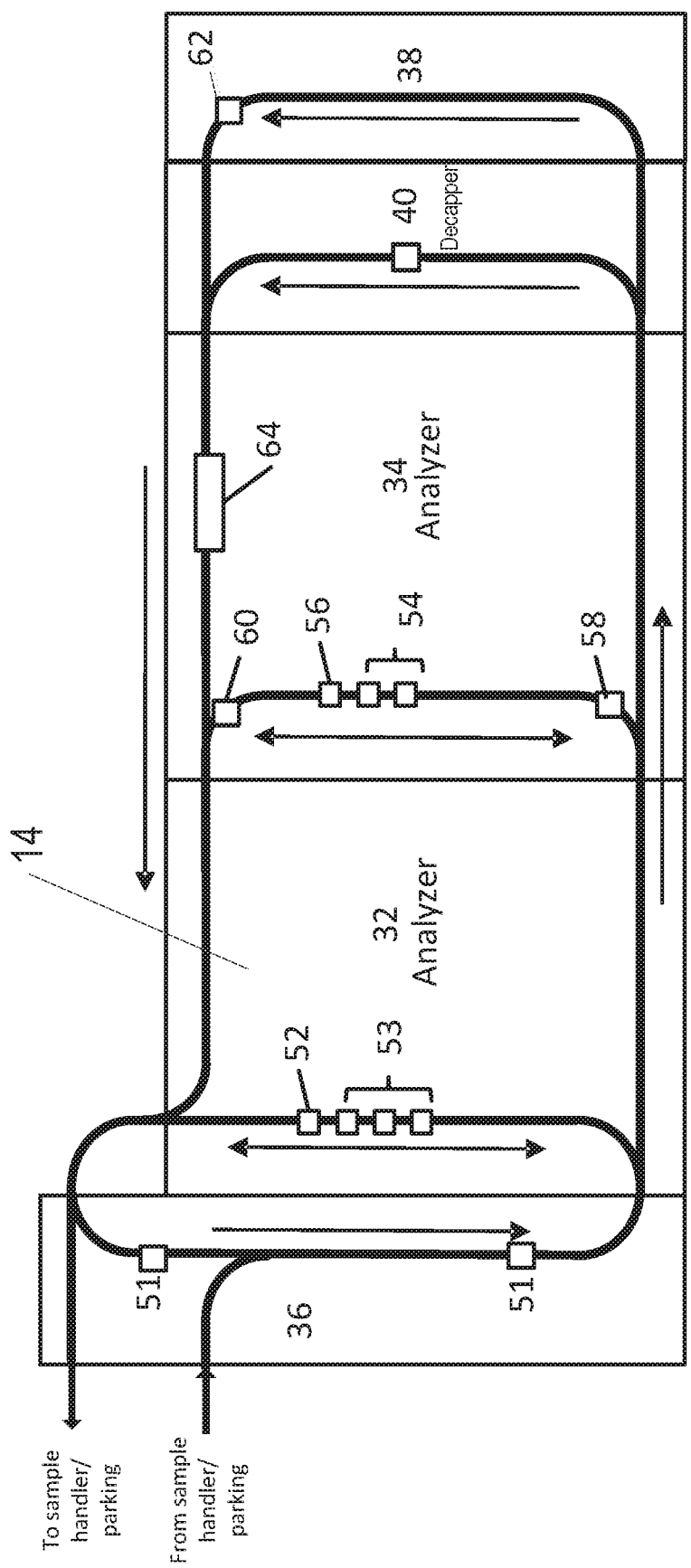
FIG. 2A is a diagrammatic view of a vessel mover which illustrates how sample transport prioritization can be implemented in some embodiments of the present invention.

FIG. 2A is a diagrammatic view of a vessel mover which illustrates how sample transport prioritization can be implemented in some embodiments of the present invention. Track 14 is a multi-branching track used by a vessel mover system. In some embodiments, the Track 14 uses a linear motor system which applies motive force to sample carriers. As can be seen, track 14 comprises branches and lengths that are provided to sample carriers 51, 52, 54, and 56, sample carrier queue 53, decapper 40, and analyzer modules of 32 and 34. This diagram represents a system configured with two analytical modules; however, the system may be configured with additional analytical modules by appending them to the right. In addition to the track segments provided by the analyzer modules 32 and 34, additional modules 36, 38, and 40 provide short dedicated track sections that may be connected to the track portions provided by the other modules. Track modules 36 and 38 provide powered track segments, without additional hardware related to sample handler modules or analyzer modules. Each analyzer includes one or more processors which control its local, internal track segment and one or more additional processors (referred to herein as "vessel mover manager processor") provide global control over the track system.

In this example, assume that analyzer module 32 has a pipetting station in proximity to carrier 52. When a sample is moved into the position of carrier 52, a pipette for analyzer module 32 can aspirate a sample portion for testing. Meanwhile, the internal track segment of analyzer module 32 can act as a physical queue 53. These internal track sections for analyzers can support bidirectional motion. Thus, physical queue 53 can be moved towards the front or the back of analyzer module 32. This allows queue 53 to act as an independent random access queue by moving an appropriate carrier to the pipetting location without flushing the entire queue around the track (e.g., samples can be moved to the back of position 52 if a sample in the middle of the queue needs to be accessed). In some embodiments, a local processor within each analyzer module handles the queuing within the physical queue in the inner track segments of each analyzer module. For example a processor within analyzer module 32 can request the access any sample on a carrier within the track segment for queue 53. Meanwhile the global processor that manages traffic on track 14 for the entire system can be responsible for adding sample carriers to each local queue and removing carriers there from. Thus, each queue within an analyzer can be managed as either a first out (FIFO) queue or a random access queue depending on the sample processing workflow. Samples 51 within track segment module 36 can utilize module 36 to bypass the sample handler section of the automation track to return for further testing among the analyzer modules.

Like queue 53 in analyzer module 32, queue 54 allows random access for the other analyzer module 34 to the local bidirectional track and any sample contained therein. Sample carrier 56 is placed at an interaction point for the local pipettor for analyzer module 34. Sample carrier 58 is arriving to join queue 54 from the outer track segment. At this point, custody of the sample in carrier 58 can be handed off from the global vessel mover manager processor to the local processor within analyzer module 34. Similarly, sample carrier 60 has completed its interaction with analyzer module 34 (e.g., analyzer module 34 has completed aspirations from the sample tube being carried) and the vessel mover manager returns carrier 60 to the main loop of track 14. Sample 62 is on return track segment module 38. This track segment can be used for samples that are bypassing local analyzer track segments. For example, if the track needs to be flushed for some reason, or if local queues are full, this path can be used to place sample carriers in effectively a holding pattern. Additionally, carriers can use the track 14 to transport more than just patient sample tubes. For example, in FIG. 2A, carrier 64 is configured to traverse the track 14 and carry reagents to analyzers, rather than patient sample tubes.

Figure 2B:
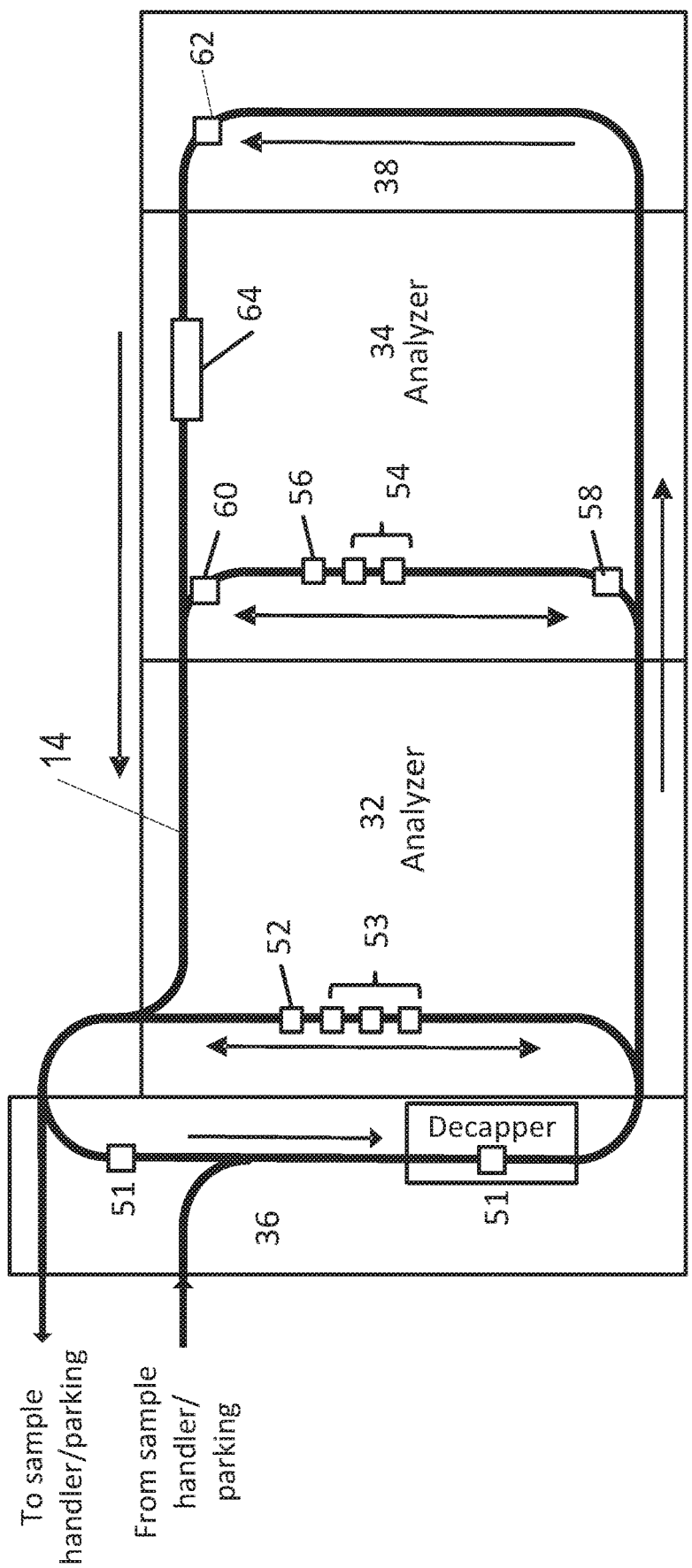
FIG. 2B shows an alternate configuration of the vessel mover shown in FIG. 2A.

FIG. 2B shows an alternate configuration of the vessel mover shown in FIG. 2A. The difference between these implementations is where the decapper is implemented within the system. In FIG. 2A, the decapper 40 is implemented as its own queue; however, as shown in FIG. 2B it can alternately be placed on the outside loop of the track. It should be noted that the vessel mover system can have more than one decapper in some implementations, such that there is one on the main track and one or more in separate queues.

The embodiments of the present disclosure may be implemented with any combination of hardware and software. In addition, the embodiments of the present disclosure may be included in an article of manufacture (e.g., one or more computer program products) having, for example, computer-readable, non-transitory media. The media has embodied therein, for instance, computer readable program code for providing and facilitating the mechanisms of the embodiments of the present disclosure. The article of manufacture can be included as part of a computer system or sold separately.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes, and menus may be derived in accordance with the principles of the invention to accomplish the same objectives. Although this invention has been described with reference to particular embodiments, it is to be understood that the embodiments and variations shown and described herein are for illustration purposes only.

Modifications to the current design may be implemented by those skilled in the art, without departing from the scope of the invention. As described herein, the various systems, subsystems, agents, managers, and processes can be implemented using hardware components, software components, and/or combinations thereof. No claim element herein is to be construed under the provisions of 35 U.S.C. 112, sixth paragraph, unless the element is expressly recited using the phrase "means for."

The invention claimed is:

1. A method for managing sample exposure to air on an automation system for performing clinical laboratory in-vitro diagnostics, the method comprising:
   receiving a sample in a capped container;
   loading the capped container onto a sample carrier;
   receiving a plurality of test requests corresponding to the sample, each test request associated with one or more analytical modules included in an automated in vitro diagnostics (IVD) system;
   identifying a first analytical module associated with a first test request;
   in response to determining that the first analytical module is available to perform the first test request, decapping the capped container, thereby yielding a decapped container;
   upon decapping the capped container, initializing a timer;
   determining a minimum time threshold associated with the first test request;
   performing a prioritized delivery of the decapped container to the first analytical module; and
   during the prioritized delivery of the decapped container to the first analytical module, prioritizing the decapped container in the first analytical module's processing queue based on the timer and the minimum time threshold.

2. The method of claim 1, further comprising:
   parking the capped container on a sample handler pending readiness of the IVD system to process the plurality of test requests; and
   prior to decapping the capped container, reloading the capped container from the sample handler.

3. The method of claim 1, further comprising:
   in response to determining that the first test request is complete, transporting the decapped container to one or more additional analytical modules or designating the plurality of test requests as being complete.

4. The method of claim 3, wherein transportation of the decapped container to the first analytical module and the one or more additional analytical modules is performed using a linear motor system which applies motive force to a carrier holding the decapped container.

5. The method of claim 1, wherein the prioritized delivery comprises:
   determining whether the decapped container is time-critical for exposure to air;
   if the decapped container is time-critical for exposure to air, entering the decapped container in a processing queue of the first analytical module ahead of one or more other samples awaiting testing; and
   if the decapped container is not time-critical for exposure to air, entering the decapped container at the end of the processing queue of the first analytical module.

6. The method of claim 1, wherein prioritizing the decapped container in the first analytical module's processing queue is further based on a relative stability value associated with the sample.

7. The method of claim 6, wherein the relative stability value is based on a predetermined table of reference data and the timer.

8. The method of claim 6, further comprising:
   in response to determining that the relative stability value of the sample exceeds a predetermined stability threshold, preventing further testing of the sample.

9. The method of claim 6, further comprising:
   in response to determining that the relative stability value of the sample exceeds a predetermined stability threshold, associating a stability flag with the sample that persists throughout all further testing of the sample.

10. The method of claim 1, further comprising:
    if the timer reaches a predetermined limit, sending an alert to an operator instructing the operator to seal the decapped container or automatically sealing the decapped container.

11. A method for managing sample exposure to air on an automation system for performing clinical laboratory in-vitro diagnostics, the method comprising:
    receiving a sample and a test request corresponding to an analytical module included in an automated IVD system;
    decapping a capped container containing the sample, thereby yielding a decapped container;
    upon decapping the capped container, initializing a timer;
    determining a minimum time threshold associated with the test request;
    determining whether the decapped container is time-critical for exposure to air;
    prioritizing the decapped container in the analytical module's processing queue based on the timer and the minimum time threshold;
    if the decapped container is time-critical for exposure to air, entering the decapped container in a processing queue of the analytical module ahead of one or more other samples awaiting testing; and
    if the decapped container is not time-critical for exposure to air, entering the decapped container at the end of the processing queue of the analytical module.

12. The method of claim 11, further comprising:
    receiving the sample in the capped container;
    loading the capped container onto a sample carrier;
    after loading the capped container onto the sample carrier, parking the capped container on a sample handler;
    in response to receiving the test request and determining that the analytical module is available to perform the test request, reloading the capped container from the sample handler.

13. The method of claim 11, further comprising:
    in response to determining that the test request is completed, transporting the decapped container to one or more additional analytical modules using a linear motor system which applies motive force to a carrier holding the decapped container.

14. The method of claim 11, wherein the decapped container is further prioritized in the analytical module's processing queue based on a relative stability value associated with the sample.

15. The method of claim 14, wherein the relative stability value is based on a predetermined table of reference data and the timer.

16. The method of claim 15, further comprising:
    in response to determining that the relative stability value of the sample exceeds a predetermined stability threshold, preventing further testing of the sample.

17. The method of claim 15, further comprising:
in response to determining that the relative stability value of the sample exceeds a predetermined stability threshold, associating a stability flag with the sample that persists throughout all further testing of the sample.

18. The method of claim 11, further comprising:
if the timer reaches a predetermined limit, sending an alert to an operator instructing the operator to seal the decapped container as soon as possible.

* * * * *